United States Patent [19]

Sander

[11] 4,038,012
[45] July 26, 1977

[54] MULTIPLE-ROLL CALENDARS FOR PRODUCING THERMOPLASTICS FILM

[75] Inventor: Gottfried Sander, Richterich, Germany

[73] Assignee: Hermann Berstorff Maschinenbau GmbH, Hannover-Kleefeld, Germany

[21] Appl. No.: 597,531

[22] Filed: July 21, 1975

[30] Foreign Application Priority Data

Aug. 14, 1974 Germany .............................. 2438983

[51] Int. Cl.² ............................................. B29C 15/00
[52] U.S. Cl. .......................... 425/363; 425/DIG. 235;
425/367; 425/372
[58] Field of Search .................... 425/324 R, 335, 336,
425/363, 365, 367, 372, DIG. 235, 162, 404,
445, 446; 72/67, 21, 110, 112, 200; 264/175,
293; 26/106

[56] References Cited

U.S. PATENT DOCUMENTS

| 2,258,659 | 10/1941 | Mosler | 425/DIG. 235 |
| 2,897,538 | 8/1959 | Shapiro et al. | 425/367 |
| 2,898,873 | 8/1959 | Cale | 425/363 |
| 3,499,957 | 3/1970 | Ancker | 425/363 |
| 3,655,312 | 4/1972 | Erb et al. | 425/372 |
| 3,936,258 | 2/1976 | Lake | 425/367 |

FOREIGN PATENT DOCUMENTS

| 1,479,605 | 5/1969 | Germany | 264/175 |

Primary Examiner—Robert L. Spicer, Jr.
Attorney, Agent, or Firm—Donald D. Jeffery

[57] ABSTRACT

A multiple-roll calender for producing thermoplastics films, in which, viewed in the direction of working, a penultimate roll is spaced from the roll which immediately precedes it so that for a period as it travels from said preceding roll to the penultimate roll the material being calendered is not in contact with any of the rolls, and said penultimate roll and a final roll which together define a final working gap, are provided with drive means whereby they can be driven at varying speeds independently of the other rolls.

A guide roller may be provided to guide the material centrally into the final working gap or a pull-off roller or pair of pull-off rollers and a constant pressure roller may be provided to guide the material to the final working gap. Alternatively a pull-off roller and a scraper device, defining with the penultimate roll a gap which narrows in a downstream direction may be provided.

4 Claims, 4 Drawing Figures

MULTIPLE-ROLL CALENDARS FOR PRODUCING THERMOPLASTICS FILM

The invention relates to multi-roll calenders for producing thermoplastic films.

On a calendering machine, independently of its roll diameter and the roll surface there is one individual optimum working gap width for each kind of synthetic plastics material. When set at this optimum working gap width, the plastics material to be processed is sufficiently homogenised without being overheated.

The loading supplies sufficient shearing energy to the synthetic plastics material and included air is forced out of the plastics material. When working with the individual working gap width, a thermal overloading of the material is prevented and an optimum output from the calender is guaranteed.

If the same calender and the same synthetic plastics material are to be used to produce a thinner film, then the rolls which define between them the final working gap of the calender are adjusted to make the final working gap smaller. The preceding working gaps must also be manually adjusted one after another to make them smaller also otherwise a pug of material of increasing size will be formed in the last working gap. In each working gap, now, substantially more shearing energy is supplied to the plastics material than is actually required for sufficiently good homogenisation. The material becomes very intensely heated and the result is overheating which is difficult to prevent and which has the familiar disadvantageous consequences on the end product.

It is for this reason that, when a thinner film is desired material additives are added to the starting material to enhance the tendency to flow or to use a different basic mixture to obtain a more easily flowing raw material. This does however diminish the economic viability of the production and the end product obtained is of a different material composition. This different material composition is an obstacle particularly in the re-cycling of production waste.

Expensive and difficult adjustment of the working gap is also necessary when the pug of material in the final working gap increases in size. All the working gaps prior to the final working gap must be made smaller one after another since the size of the pug in the final working gap must be kept as small as possible in order to produce good quality film.

If the final working gap is running empty, there is a danger of the calender rolls running against one another and becoming damaged. Therefore, a definite quantity of pug must always be present, which can be controlled by manual variation of the preceding working gaps. This regulation of the pug is however a slow process, as can be imagined. For safety reasons, therefore, always a larger pug is used in the final working gap than the minimum quantity of pug corresponding to the attainment of good quality film.

If it is desired to produce a film, the thickness of which is greater than the optimum working gap width, then it is necessary to proceed by reversing the process needed for a thinner film. All the working gaps have to be made larger. Now there is no longer a guarantee of expressing air drawn into the material and it no longer certain that the material will be adequately homogenised.

According to the invention, there is provided a multiple-roll calender for producing thermoplastics films, in which, viewed in the direction of working, a penultimate roll is spaced from the roll which immediately precedes it so that for a period as it travels from said preceding roll to the penultimate roll the material being calendered is not in contact with any of the rolls, and said penultimate roll and a final roll which together define a final working gap, are provided with drive means whereby they can be driven at varying speeds independently of the other rolls.

By reason of the invention, it is possible for all the working gaps upstream of the final working gap initially to be set ot the optimum and left at that setting. Only the final working gap, formed between said penultimate roll and said final roll, needs to be varied in size if it is desired to attain film thicknesses other than the optimum working gap width.

If it is desired to achieve a thickness of film which is less than the optimum working gap width, the final working gap is made smaller. The resulting increasing pug of material in the final gap can simply be limited again by increasing the peripheral speed of the last two rolls. The variation in speed of the last two rolls is made possible by the offset disposition of the penultimate roll with respect to said preceeding roll.

Various thicknesses of film can thus be produced by varying the speed of the last two rolls and by varying the width of only the final working gap. A complicated individual gap adjustment of each working gap is avoided. Since all the working gaps disposed upstream of the final working gap can remain adjusted to the optimum setting, good homogenisation of the material is always guaranteed. Furthermore, the loadings on the calender from the pressures of the roll gaps are considerably reduced.

There is no need to vary the mixture of the plastics mixture to be processed. Furthermore, the size of pug in the final gap can be regulated substantially more quickly. Since the size of pug in the final working gap can be controlled directly and therefore rapidly by varying the speed of the last two rolls, it is possible to work with a very small pug which has a favourable effect on the quality of the finished film.

The calender may include a guide roller to guide the skin of plastics material leaving said roll centrally into the final working gap. Since the plastics skin can then run directly into the final gap without previously contacting the penultimate roll, central delivery is possible. Central delivery can produce a symmetrical pug which can further improve the quality of the finished film.

If a thickness of film greater than the optimum working gap width is to be produced, the peripheral speed of the penultimate roll is less than the periphery speed of said preceding roll which is part of the permanently adjusted part of the calender. In order to feed a smooth plastics skin to the final working gap, there can be provided downstream of said preceding roll, a pull-off roller or a pair of pull-off rollers rotated at the same or a greater peripheral speed, a pressure roller of constant pressure being disposed upstream of the final working gap and co-operating with the penultimate roll.

In another advantageous embodiment of the invention, said preceding roll is followed by a pull-off roller rotated at the same or greater peripheral speed and the pull-off roller is followed by a scraper device, which device forms, with said penultimate roll, a gap which narrows in a downstream direction and is positioned upstream of the final working gap. The plastics skin emanating from said roll is, in the case of production of films of a thickness greater than the optimum working gap width, compressed in the narrowing gap and is transported as a smooth skin on the penultimate roll and on to the final working gap.

The invention is diagrammatically illustrated by way of example in the accompanying drawings in which.

Figure 1:
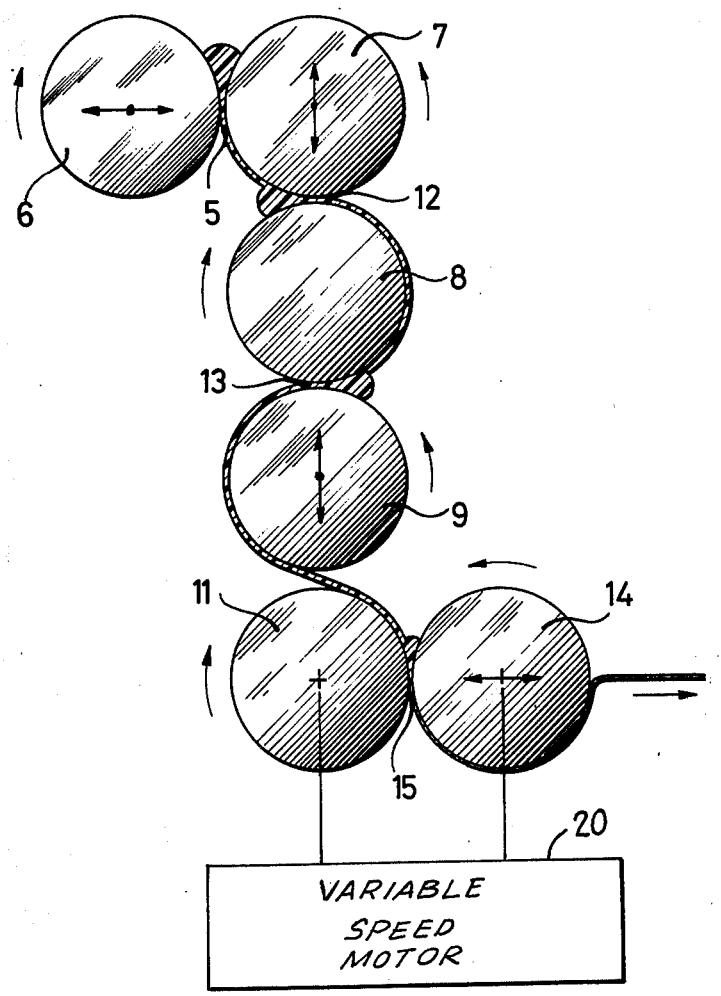
FIG. 1 shows a 6-roll double-L calender according to the invention.

Referring to the drawings and firstly to FIG. 1, in a 6-roll double-L calender, plastics material to be processed is fed into a roll gap 5 between horizontally adjacently disposed rolls 6 and 7. Disposed vertically below the roll 7 are rolls 8, 9 and 11. In known manner the rolls 7, 8 and 9 co-operate with one another forming working gaps 12 and 13. The roll 11 is spaced from the preceding roll 9. Horizontally alongside the roll 11 is a roll 14. The penultimate roll 11 and the final roll 14 form a final working gap 15. To vary the width of the final working gap 15, the final roll 14 is mounted for horizontal displacement as indicated by the double headed arrow thereon.

Plastics material to be processed is thoroughly homogenised in the working gaps 5, 12 and 13, which gaps are adjusted to the optimum setting, without being thermally overloaded. As shown by double arrows in FIG. 1, the rolls 7 and 9 are mounted for vertical adjustment and roll 6 is mounted for horizontal adjustment, to provide the desired gap. Due to the spacing apart of the rolls 9 and 11 the plastics skin travels over a short free distance in which it has no contact with any rolls, to the penultimate roll 11 and into the final working gap 15. When it leaves the final working gap 15, the film is pulled off by the final roll 14.

That part of the calender comprising the rolls 6, 7, 8 and 9 remains constantly unaltered with a once-set individual optimum working gap width, the size of which has been previously and empirically ascertained for each mixture of plastics material.

If the situation arises in operation that the pug of material in the final working gap 15 increases in size and the final film thickness is correct, the peripheral speed of the rolls 11 and 14 is increased, for example, by a variable speed motor 20 as shown schematically in FIG. 1. The pug of material in the gap 15 will then rapidly be reduced to the desired size.

The action is reversed when the pug of material has diminished to the desired size, i.e. the peripheral speed of the rolls 11 and 14 is reduced. The size of the pug of material can be monitored by known scanning means which are electrically connected to the means of driving the rolls 11 and 14 to control the speed thereof.

If a film is to be produced of a thickness which is less than the optimum working gap width, the roll 14 is displaced horizontally towards the roll 11 until the final working gap 15 is of the desired size and the speed of the rolls 11 and 14 is increased. No adjustment is made to the setting of the rolls 6, 7, 8 and 9.

The procedure is reversed when it is desired to produce a thickness of film greater than the optimum working gap width.

Figure 2:
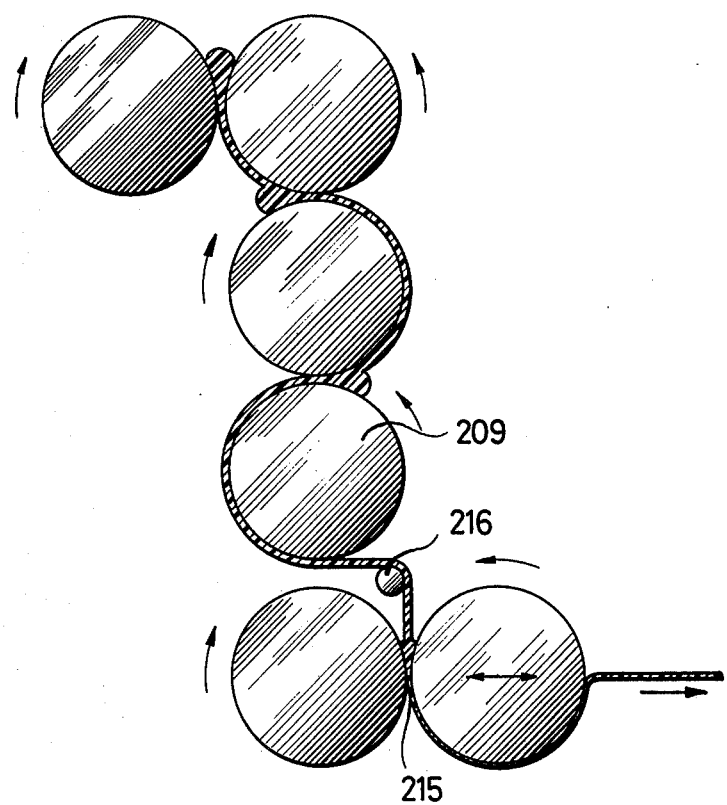
FIG. 2 shows a modification of the calender of FIG. 1 including a guide roller for central application of material to the final working gap.

Referring to FIG. 2, a calender, similar to that shown in FIG. 1, has a guide roller 216 positioned downstream of a roll 209 corresponding to the roll 9 of FIG. 1. The guide roller 216 is so disposed that it guides the plastics skin from the roll 209 centrally into the final working gap 215 in order to guarantee a symmetrical pug.

Figure 3:
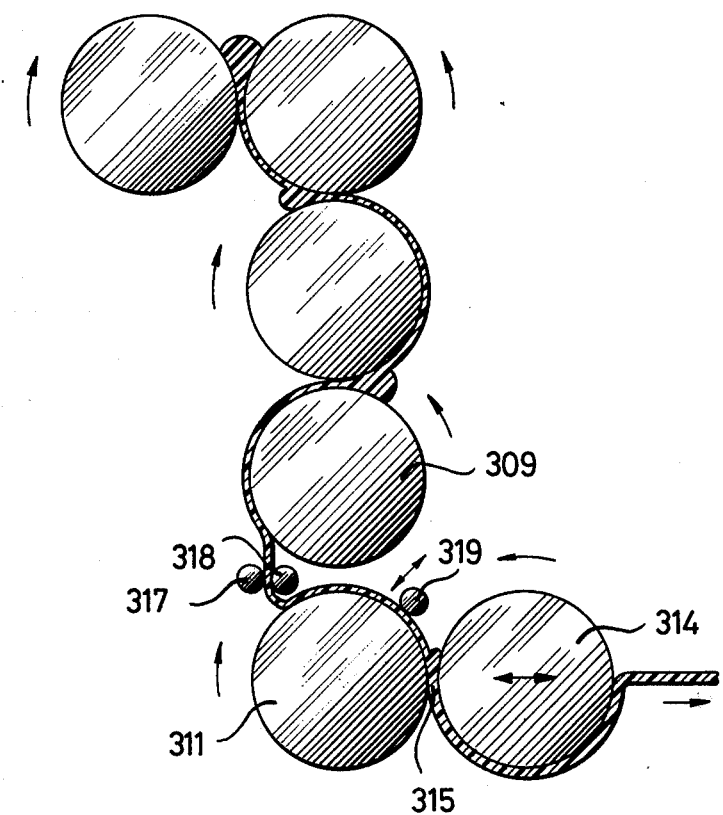
FIG. 3 shows another modification of the calender of FIG. 1 for producing films of a thickness greater than the optimum working gap width.

In the case of the calender shown in FIG. 3, the third roll 309 from the end is followed by a pair of pull-off rollers 317, 318. Disposed upstream of the final working gap 315 is a constant-pressure presser roller 319 which co-operates with the penultimate roll 311.

If it is desired to produce, on the calender, films of a thickness greater than the optimum working gap width for a particular kind of synthetic plastics film, then to increase the last working gap 315, the final roll 314 is displaced horizontally away from the penultimate roll 311. The peripheral speed of the last two rolls 311 and 314 is reduced for example, by a variable speed motor of the type shown schematically in FIG. 1, and is less than the peripheral speed of the third roll 309 from the end and the peripheral speed of the pair of pull-off rollers 317, 318. The plastics skin pulled off the roll 309 is applied to the surface of the more slowly revolving penultimate roll 311 and becomes pushed together in the direction of feed. The constant-pressure roller 319 is so adjusted that the plastics skin is smoothed before it is fed to the last working gap 315.

Figure 4:
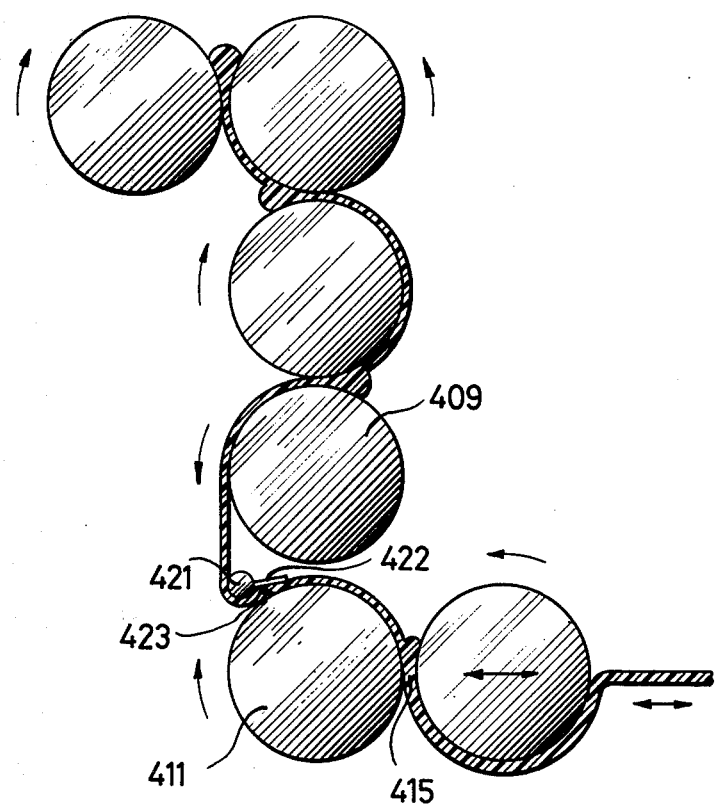
FIG. 4 shows yet another modification of the calender of FIG. 1 for achieving considerable thicknesses of film.

In the calender of FIG. 4 for similar operation to that shown in FIG. 3, a pull-off roller 421 pulls the plastics skin off a roll 409. A scraper device 422 downstream of the pull-off roller 421 takes the plastics skin from the pull-off roller 421 and feeds it to the surface of the more slowly revolving penultimate roll 411. The plastics skin is compressed and smoothed out in a narrowing gap 423 between the scraper device 422 and the roll 411, before it is transported to the final working gap 415.

Although not shown in FIGS. 2–4, it will be understood that the rolls which define the roll gaps can be adjusted as shown by double arrows in FIG. 1, and that a variable speed motor can be employed to vary the speed of rotation of the penultimate and final rolls.

What is claimed is:

1. A calender for producing thermoplastics films and comprising a plurality of calender rolls wherein viewed in the direction of working, a penultimate roll of said rolls is spaced from a roll of said rolls which immediately precedes said penultimate roll so that in operation of the calender a portion of the material being calendered, for a period as it travels from said preceding roll to said penultimate roll, is not in contact with any of said rolls, and said penultimate roll and a final one of said rolls which together define a final working gap, are provided with drive means whereby they can be driven at varying speeds independently of the others of said rolls.

2. A multiple-roll calender as claimed in claim 1, further comprising a guide roller to guide the material being calendered from said preceding roll centrally into said final working gap.

3. A multiple-roll calender as claimed in claim 1, further comprising at least one pull-off roller positioned downstream of said preceding roll and rotated at at least as great a peripheral speed as said preceding penultimate roll, and a constant-pressure roller co-operating with said penultimate roll and disposed upstream of said final working gap.

4. A multiple-roll calender as claimed in claim 1, further comprising a pull-off roller positioned downstream of said preceding roll and rotated at at least as great a peripheral speed as said preceding roll and a scraper device positioned downstream of said pull-off roller, upstream of said final working gap, spaced from said penultimate roll and so positioned as to form with said penultimate roll a gap which narrows in a downstream direction.

* * * * *